United States Patent
Chen et al.

(10) Patent No.: US 12,541,335 B2
(45) Date of Patent: Feb. 3, 2026

(54) DISPLAY METHOD FOR INTERACTIVE SYSTEM INCLUDING A DISPLAY DIVIDED INTO A DISPLAY AREA AND AN EXTENSION AREA, INTERACTIVE SYSTEM, AND ELECTRONIC DEVICE

(71) Applicant: HUAWEI TECHNOLOGIES CO., LTD., Guangdong (CN)

(72) Inventors: Hao Chen, Shenzhen (CN); Xiaoxiao Chen, Nanjing (CN); Kai Hu, Wuhan (CN); Xiaoyun Yang, Shenzhen (CN); Bing Gu, Nanjing (CN); Jianfeng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 33 days.

(21) Appl. No.: 17/843,596

(22) Filed: Jun. 17, 2022

(65) Prior Publication Data
US 2022/0317964 A1    Oct. 6, 2022

Related U.S. Application Data

(63) Continuation of application No. PCT/CN2020/136498, filed on Dec. 15, 2020.

(30) Foreign Application Priority Data

Dec. 18, 2019  (CN) .......................... 201911312368.0

(51) Int. Cl.
*G06F 3/14* (2006.01)
*G06F 3/01* (2006.01)

(52) U.S. Cl.
CPC ............ *G06F 3/1423* (2013.01); *G06F 3/011* (2013.01)

(58) Field of Classification Search
None
See application file for complete search history.

(56) References Cited

U.S. PATENT DOCUMENTS

| 6,545,669 B1 * | 4/2003 | Kinawi ................. G06F 3/1438 345/173 |
| 2005/0192924 A1 * | 9/2005 | Drucker ................ G06F 3/0483 |
| 2006/0026521 A1 * | 2/2006 | Hotelling ............... G06F 3/0488 715/702 |
| 2006/0274036 A1 * | 12/2006 | Hioki ...................... G06F 3/045 345/156 |
| 2008/0066016 A1 * | 3/2008 | Dowdy .................. G06F 16/68 715/854 |

(Continued)

FOREIGN PATENT DOCUMENTS

| CN | 103593136 A | * | 2/2014 |
| CN | 104516654 A |   | 4/2015 |

(Continued)

*Primary Examiner* — Kirk W Hermann
(74) *Attorney, Agent, or Firm* — WOMBLE BOND DICKINSON (US) LLP

(57) ABSTRACT

An interactive system includes a display, and the a display method for the interactive system includes: determining a display area and an extension area that are obtained by dividing the display; generating event information based on an operation performed by a user on the extension area; and responding, in the display area based on the event information, to an operation corresponding to the event information.

19 Claims, 8 Drawing Sheets

(56) References Cited

U.S. PATENT DOCUMENTS

| | | | | |
|---|---|---|---|---|
| 2009/0322690 A1* | 12/2009 | Hiltunen | G06F 1/1649 | 345/1.3 |
| 2010/0064244 A1* | 3/2010 | Kilpatrick, II | H04M 1/0243 | 345/1.3 |
| 2010/0281374 A1* | 11/2010 | Schulz | H04M 1/72469 | 715/830 |
| 2013/0120447 A1* | 5/2013 | Kim | G06T 11/60 | 345/173 |
| 2014/0267091 A1* | 9/2014 | Kim | G06F 1/1637 | 345/173 |
| 2014/0306908 A1* | 10/2014 | Nagaraju | G06F 1/1652 | 345/173 |
| 2015/0212610 A1* | 7/2015 | Tian | G06F 3/0416 | 345/173 |
| 2016/0085268 A1* | 3/2016 | Aurongzeb | G06F 1/1652 | 427/259 |
| 2017/0192733 A1* | 7/2017 | Huang | G06F 3/1446 | |
| 2019/0339854 A1* | 11/2019 | Wei | G06F 3/04883 | |
| 2020/0201545 A1* | 6/2020 | Li | G06F 3/04817 | |
| 2020/0401277 A1* | 12/2020 | Williams | G06F 3/0488 | |
| 2021/0132790 A1* | 5/2021 | Kim | G06F 3/0484 | |

FOREIGN PATENT DOCUMENTS

| | | | | | |
|---|---|---|---|---|---|
| CN | 105094654 | A | | 11/2015 | |
| CN | 106354458 | A | | 1/2017 | |
| CN | 106775411 | A | * | 5/2017 | G06F 3/04883 |
| CN | 107291369 | A | * | 10/2017 | G06F 3/04886 |
| CN | 108459790 | A | * | 8/2018 | |
| CN | 108920082 | A | | 11/2018 | |
| CN | 109145570 | A | * | 1/2019 | G06F 21/36 |
| CN | 109426475 | A | * | 3/2019 | G06F 3/14 |
| CN | 106445396 | B | * | 9/2019 | G06F 3/041 |
| CN | 110389802 | A | | 10/2019 | |
| CN | 105094654 | B | * | 2/2020 | G06F 3/048 |
| CN | 110968252 | A | | 4/2020 | |
| KR | 20090011502 | A | * | 2/2009 | |
| WO | 2015168977 | A1 | | 11/2015 | |

* cited by examiner

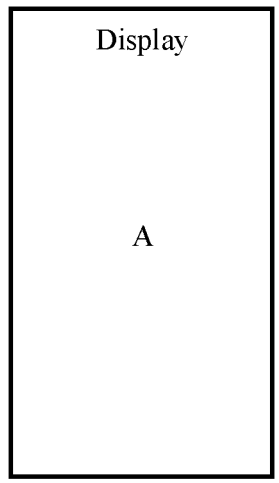
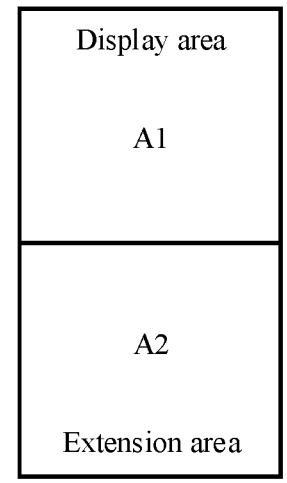
FIG. 4a  FIG. 4b
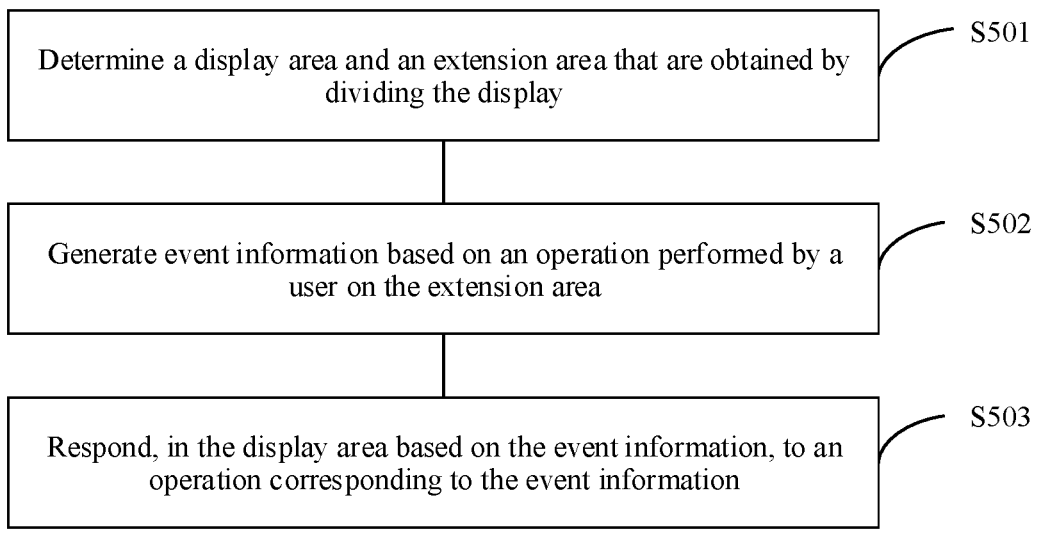
FIG. 5

DISPLAY METHOD FOR INTERACTIVE SYSTEM INCLUDING A DISPLAY DIVIDED INTO A DISPLAY AREA AND AN EXTENSION AREA, INTERACTIVE SYSTEM, AND ELECTRONIC DEVICE

CROSS-REFERENCE TO RELATED APPLICATIONS

This application is a continuation of International Application No. PCT/CN2020/136498, filed on Dec. 15, 2020, which claims priority to Chinese Patent Application No. 201911312368.0, filed on Dec. 18, 2019. The disclosures of the aforementioned applications are hereby incorporated by reference in their entireties.

TECHNICAL FIELD

This application relates to the field of human-computer interaction technologies, and in particular, to a display method for an interactive system, an interactive system, an electronic device, and a computer-readable storage medium.

BACKGROUND

Currently, a hyper-curved screen of an electronic device, such as a flexible screen and a foldable screen, brings a brand new interaction manner to a user. In addition, to improve user experience, a screen size is increasingly large. In some scenarios, for example, an operation on a screen may be difficult to implement by using one hand, or in some application scenarios, the user needs to simultaneously touch and press a plurality of locations or touch the screen for a plurality of times to complete interaction. Therefore, interaction experience needs to be further improved.

SUMMARY

In view of this, this application provides a display method for an interactive system, an interactive system, an electronic device, and a computer-readable storage medium, to bring a brand new interaction manner to a user and improve user experience.

In one embodiment of this application, a display method for an interactive system is provided. The following describes this application from a plurality of aspects. For embodiments and beneficial effects of the following plurality of aspects, reference may be made to each other.

According to a first aspect, this application provides a display method for an interactive system, to be applied to the interactive system. The interactive system includes a display, and the method includes: determining a display area and an extension area that are obtained by dividing the display; generating event information based on an operation performed by a user on the extension area, where the operation on the extension area may be a touch action of the user, or may be a behavior posture, or the like; and the event information may include information corresponding to one or more of a tap event, a touch and hold event, a slide event, and a user-predetermined touch event; and responding, in the display area based on the event information, to an operation corresponding to the event information, where the operation corresponding to the event information includes: one or more of a tap event, a touch and hold event, a slide event, and a user-predetermined touch event.

According to the display method for the interactive system in this application, the user may affect an operation in the display area by performing an operation in the extension area, to bring a brand new interaction manner to the user and improve interaction experience of the user.

In one embodiment of the first aspect, the display area and the extension area are two different areas that belong to a same physical display. For example, the display area and the extension area may be a first screen and a second screen that are of a foldable screen in a flexible screen, or may be a planar part and a curved part that are on a curved screen, or may be two parts obtained by dividing a planar screen.

In one embodiment of the first aspect, division of the display area and the extension area is determined by an underlying display system. In one embodiment, that the display area and the extension area are obtained by dividing the display includes the following: The underlying display system determines an original screen size of the display, a screen size of the display area, and a screen size of the extension area. In addition, the underlying display system indicates the screen size of the display area as a screen size for system display, and uses the display area for displaying of the interactive system.

In one embodiment of the first aspect, division of the display area and the extension area is determined by a window layer. In one embodiment, that the window layer divides the display into the display area and the extension area includes the following: An original screen size of the display, a screen size of the display area, and a screen size of the extension area are determined; and the sizes of the display area and the extension area may be delimited by using a screen splitting operation instruction of the user, to determine the original screen size of the display, the screen size of the display area, and the screen size of the extension area. In addition, the window layer indicates the screen size of the display area as a screen size for system display, and uses the display area for displaying of the interactive system.

In one embodiment of the first aspect, the display area and the extension area respectively belong to two different physical displays. For example, for a physically-divided foldable screen, one screen of the foldable screen is used as a display area, the other screen thereof is used as an extension area, and sizes of the two screens are determined.

In one embodiment of the first aspect, the responding, based on the event information, to an operation corresponding to the request message includes: determining the screen size of the display area and the screen size of the extension area; mapping the event information to the display area based on a relationship between the screen size of the display area and the screen size of the extension area; and responding, in the display area, to the operation corresponding to the event information.

In one embodiment of the first aspect, the mapping the event information to the display area based on a relationship between the screen size of the display area and the screen size of the extension area includes: determining locations of the display area and the extension area in a preset coordinate system; determining, based on the preset coordinate system, coordinates of an original touch point of the event information in the preset coordinate system, and determining a location of the original touch point relative to the display area and the extension area; and mapping, based on the coordinates and the relationship between the screen size of the display area and the screen size of the extension area, the coordinates of the original touch point of the event information to a corresponding location in the display area. In other words, the coordinates of the original touch point of the event information are mapped, by using a mapping relationship, to a corresponding location in the display area.

In this way, an operation in the display area may be affected by performing an operation in the extension area, to bring a brand new interaction manner to the user.

In one embodiment of the first aspect, the responding, in the display area based on the event information, to an operation corresponding to the event information includes: establishing a mapping relationship between a preset operation in the extension area and the operation in the display area, so that the preset operation input by the user in the extension area is mapped to the operation of the user in the display area. In other words, a mapping relationship may be preset in the system, and a preset operation input by the user in the extension area is mapped to the operation in the display area based on the mapping relationship, where the preset operation may be preset by the system, or may be set based on a requirement of the user, to further improve interaction experience of the user.

In one embodiment of the first aspect, the display is a curved screen, a planar screen, or a foldable screen, the extension area is disposed on an edge area or a partial area that is of the curved screen or the planar screen, and the extension area is disposed on one screen of the foldable screen, or on a part of the one screen, or on a folded area formed after the foldable screen is folded.

According to a second aspect, this application provides an interactive system, including a display, a processing module, and a generation module, where the interactive system is configured to determine a display area and an extension area that are obtained by dividing the display, and generate event information based on an operation performed by a user on the extension area. The event information includes information corresponding to one or more of a tap event, a touch and hold event, a slide event, a user-predetermined touch event, and screen recording. The processing module is configured to respond, in the display area based on the event information, to an operation corresponding to the event information, where the operation corresponding to the event information includes one or more of a tap event, a touch and hold event, a slide event, and a user-predetermined touch event.

According to the interactive system in this embodiment of this application, the user may affect an operation in the display area by performing an operation in the extension area, to bring a brand new interaction manner to the user and improve interaction experience of the user.

In one embodiment of the second aspect, the display area and the extension area are two different areas that belong to a same physical display. For example, the display area and the extension area may be a first screen and a second screen that are of a foldable screen in a flexible screen, or may be a planar part and a curved part that are on a curved screen, or may be two parts obtained by dividing a planar screen.

In one embodiment of the second aspect, division of the display area and the extension area is determined by an underlying display system, and the display area and the extension area are obtained by dividing the display. The processing module is further configured to determine an original screen size of the display, a screen size of the display area, and a size of the extension area. In addition, the size of the display area is indicated as a screen size for system display, and the display area is used for displaying of the interactive system.

In one embodiment of the second aspect, division of the display area and the extension area is determined by a window layer, and the display area and the extension area are obtained by dividing the display. The processing module is further configured to determine an original screen size of the display, a size of the display area, and a screen size of the extension area. In addition, the screen size of the display area is indicated as a screen size for system display, and the display area is used for displaying of the interactive system.

In one embodiment of the second aspect, the display area and the extension area respectively belong to two different physical displays. For example, for a physically-divided foldable screen, one screen of the foldable screen is used as a display area, the other screen thereof is used as an extension area, and screen sizes of the two screens are determined.

In one embodiment of the second aspect, the processing module is configured to: determine the screen size of the display area and the screen size of the extension area; map the event information to the display area based on a relationship between the screen size of the display area and the screen size of the extension area; and respond, in the display area, to the operation corresponding to the event information.

In one embodiment of the second aspect, the processing module is further configured to: determine locations of the display area and the extension area in a preset coordinate system; determine, based on the preset coordinate system, coordinates of an original touch point of the event information in the preset coordinate system, and determine a location of the original touch point relative to the display area and the extension area; and map, based on the coordinates and the relationship between the screen size of the display area and the screen size of the extension area, the coordinates of the original touch point of the event information to a corresponding location in the display area.

In one embodiment of the second aspect, the processing module is further configured to establish a mapping relationship between a preset operation in the extension area and the operation in the display area, so that the preset operation input by the user in the extension area is mapped to the operation of the user in the display area. In other words, a mapping relationship may be preset in the system, and a preset operation input by the user in the extension area is mapped to the operation in the display area based on the mapping relationship, where the preset operation may be preset by the system, or may be set based on a requirement of the user, to further improve interaction experience of the user.

In one embodiment of the second aspect, the display is a curved screen, a planar screen, or a foldable screen, the extension area is disposed on an edge area or a partial area that is of the curved screen or the planar screen, and the extension area is disposed on one screen of the foldable screen, or on a part of the one screen, or on a folded area formed after the foldable screen is folded.

According to a third aspect, this application provides an electronic device, including a processor and a memory, where the memory stores instructions, and the processor is configured to read the instructions stored in the memory, to perform the method in the embodiment of the first aspect.

According to a fourth aspect, this application provides a computer-readable storage medium. The computer-readable storage medium stores a computer program, and when the computer program is run by the processor, the processor is enabled to perform the method in the embodiment of the first aspect.

BRIEF DESCRIPTION OF DRAWINGS

FIG. 4(a) and FIG. 4(b) are a schematic diagram of a structure of a display of an interactive system according to an embodiment of this application;

FIG. 5 is a flowchart of a display method for an interactive system according to an embodiment of this application;

DESCRIPTION OF EMBODIMENTS

The following clearly and completely describes the technical solutions in embodiments of this application with reference to the accompanying drawings in embodiments of this application. Clearly, the described embodiments are some but not all of embodiments of this application. All other embodiments obtained by a person of ordinary skill in the art based on embodiments of this application without creative efforts shall fall within the protection scope of this application.

The following further describes embodiments of this application with reference to accompanying drawings.

A display method for an interactive system provided in embodiments of this application may be applied to an electronic device that has a display, such as a mobile phone, a tablet computer, a notebook computer, a personal computer, a netbook, a handheld computer, a personal digital assistant, or a wearable device. This is not limited in this application.

Figure 1:
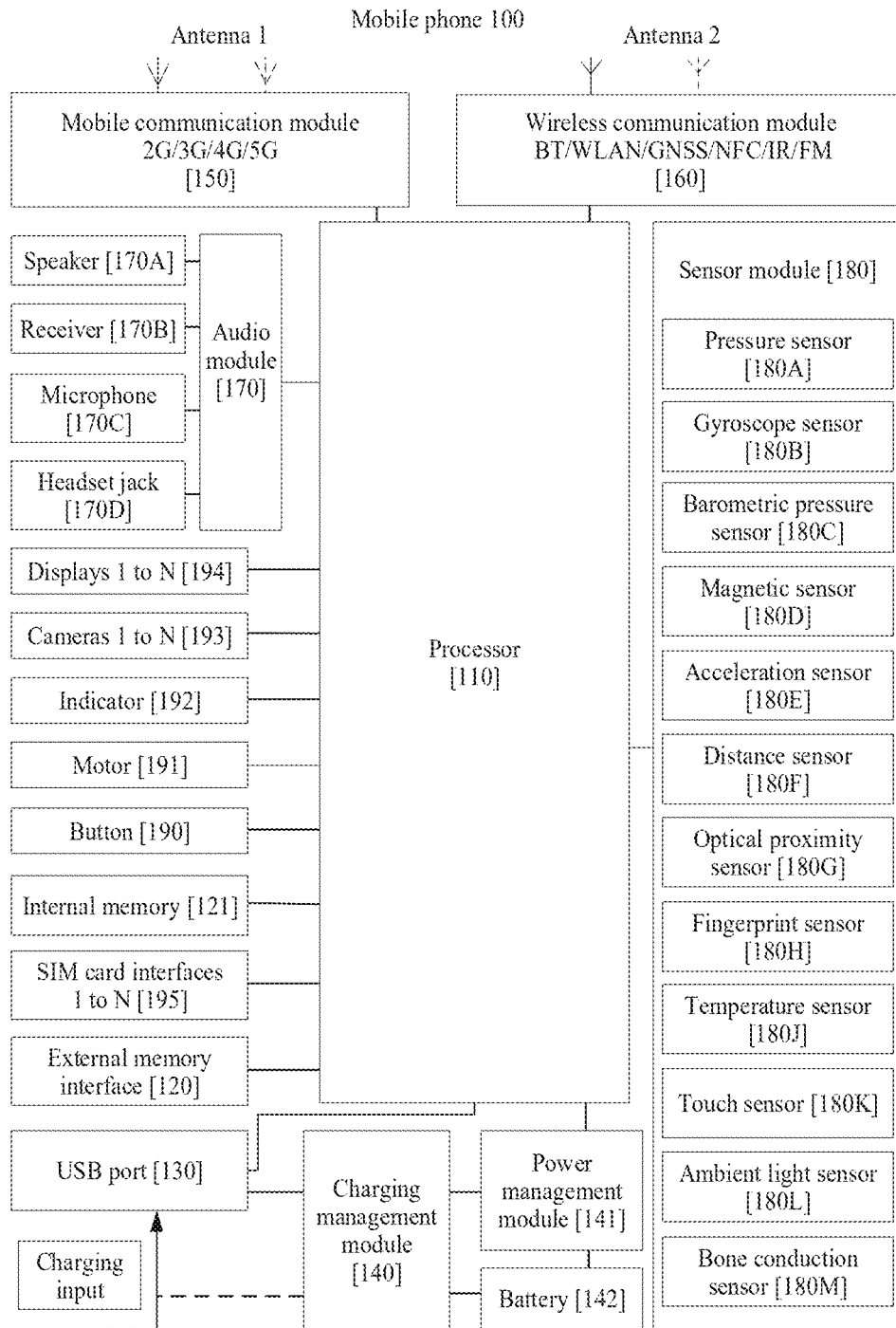
FIG. 1 is a schematic diagram of a structure of an interactive system according to an embodiment of this application.

The following uses a mobile phone as an example to describe the display method for an interactive system in this application. FIG. 1 is a schematic diagram of a structure of a mobile phone.

The mobile phone 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application does not constitute a limitation on the mobile phone 100. In other embodiments of this application, the mobile phone 100 may include more or fewer components than those shown in the figure, or combine some components, or split some components, or have a different component arrangement. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors.

The processor may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store an instruction or data that has just been used or is cyclically used by the processor 110. If the processor 110 needs to use the instruction or the data again, the processor 110 may directly invoke the instruction or the data from the memory. In this way, repeated access is avoided, waiting time of the processor 110 is reduced, and system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like by using different I2C bus interfaces. For example, the processor 110 may be coupled to the touch sensor 180K by using an I2C interface, so that the processor 110 communicates with the touch sensor 180K by using the I2C bus interface, to implement a touch function of the electronic device 100.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 by using the CSI interface, to implement a photographing function of the electronic device 100. The processor 110 communicates with the display 194 by using the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may be further configured as an I2C interface, an I2S interface, a UART interface, an MIPI interface, or the like.

It may be understood that an interface connection relationship between modules illustrated in this embodiment of this application is merely an example for description, and does not constitute a limitation on a structure of the electronic device 100. In some other embodiments of this application, the electronic device 100 may alternatively use an interface connection manner different from that in the foregoing embodiment, or a combination of a plurality of interface connection manners.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the mobile phone 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the mobile phone 100 may be configured to cover one or more communication frequency bands. Different antennas may be multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a solution to wireless communication that includes 2G/3G/4G/5G or the like and that is applied to the mobile phone 100. The mobile communication module 150 may include at least one filter, a switch, a power amplifier, a low noise amplifier (LNA), and the like. The mobile communication module 150 may receive an electromagnetic wave by using the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation by using the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The wireless communication module 160 may provide a solution to wireless communication that is applied to the mobile phone 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processing module. The wireless communication module 160 receives an electromagnetic wave by using the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation by using the antenna 2.

In some embodiments, in the mobile phone 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The mobile phone 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

In an embodiment of this application, the display 194 may include a display panel and a display, for example, the touch sensor 180K. The display is configured to: output display content to a user, and display the display content on the display panel, for example, display an image or a video. The display panel may use a liquid crystal display (LCD), an organic light-emitting diode (OLED), an active-matrix organic light emitting diode (AMOLED), a flexible light-emitting diode (FLED), Miniled, MicroLed, Micro-oLed, a quantum dot light emitting diode (QLED), or the like.

A touch component is the touch sensor 180K. The touch sensor 180K may be disposed on the display 194. The touch sensor 180K and the display 194 constitute a touchscreen which is also referred to as a "touchscreen". The touch sensor 180K is configured to detect a touch operation performed on or near the touch sensor. The touch sensor may transfer the detected touch operation to the application processor, to determine a type of a touch event. A visual output related to the touch event may be provided by using the display 194. In some other embodiments, the touch sensor 180K may be alternatively disposed on a surface of the mobile phone 100, and is located on a location different from that of the display 194.

It should be noted that one or more touch components may be set based on a quantity of display areas or a quantity of displays. For example, an extension area and a display area that are of a display may respectively correspond to a touch component, to receive user operations from different areas and generate touch events.

The mobile phone 100 may implement a photographing function by using the ISP, the camera 193, the video codec, the GPU, the display 194, the application processor, and the like.

The ISP is configured to process data fed back by the camera 193. For example, during photographing, a shutter is opened, light is transferred to a camera photosensitive element by using a lens, an optical signal is converted into an electrical signal, and the electrical signal is transferred, by the camera photosensitive element, to the ISP for processing and is converted into an image that is visible to a naked eye. The ISP may further perform algorithm optimization on noise, brightness, and complexion that are of the image. The ISP may further optimize parameters such as exposure and color temperature that are of a photographing scenario. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, an RGB format or a YUV format. In some embodiments, the mobile phone 100 may include one or N cameras 193, where N is a positive integer greater than 1.

The digital signal processor is configured to process a digital signal, and may process another digital signal in addition to the digital image signal. For example, when the mobile phone 100 selects a frequency, the digital signal processor is configured to perform Fourier transform on frequency energy, and the like.

The video codec is configured to compress or decompress a digital video. The mobile phone 100 may support one or more video codecs. In this way, the mobile phone 100 may play or record videos in a plurality of encoding formats, for example, moving picture experts group (MPEG)1, MPEG2, MPEG3, and MPEG4.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the mobile phone 100 may be implemented by using the NPU, for example, image recognition, facial recognition, speech recognition, and text understanding.

The external memory interface 120 may be configured to connect to an external storage card, for example, a Micro SD card, to extend a storage capability of the mobile phone 100. The external storage card communicates with the processor 110 through the external memory interface 120, to implement a data storage function. For example, files such as music and a video are stored in the external storage card.

The internal memory 121 may be configured to store computer executable program code, where the executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) and the like created during use of the mobile phone 100. In addition, the internal memory 121 may include a high-speed random access memory, or may include a nonvolatile memory, such as at least one magnetic disk storage device, a flash memory, or a universal flash storage (UFS). The processor 110 executes various functional applications of the mobile phone 100 and data processing of the mobile phone 100 by running the instructions stored in the internal memory 121 and/or instructions stored in the memory that is disposed in the processor.

The mobile phone 100 may implement an audio function by using the audio module 170, the speaker 170A, the receiver 170B, the microphone 170C, the headset jack 170D, the application processor, and the like, for example, implement a music playback function and a recording function.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates that are made of conductive materials. When a force is applied to the pressure sensor 180A, capacitance between electrodes changes. The mobile phone 100 determines pressure intensity based on a capacitance change. When a touch operation is performed on the display 194, the mobile phone 100 detects touch operation intensity by using the pressure sensor 180A. The mobile phone 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating an SMS message is performed.

In embodiments of this application, the display 194 of the mobile phone 100 is divided into a display area and an extension area. The display area and the extension area may belong to one physical display, or may respectively belong to two physical screens, for example, one type of a foldable screen, where one screen of the two screens may be used as a display area, and the other screen may be used as an extension area. A touch component may be disposed in the extension area, and is configured to receive an operation performed by a user on the extension area and generate a corresponding touch event, for example, one or more of a tap event, a touch and hold event, a slide event, and a user-predetermined touch event.

Figure 2D:
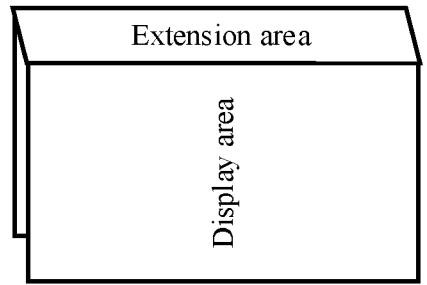
FIG. 2(a) to FIG. 2(d) are a schematic diagram of a structure of distribution of an extension area and a display area that are on a display of an interactive system according to an embodiment of this application.
Figure 2C:
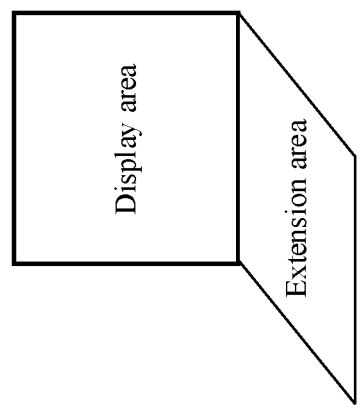
Figure 2B:
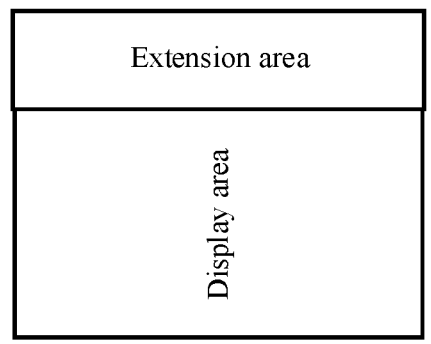
Figure 2A:
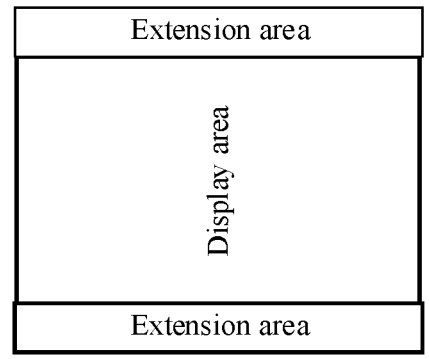

As shown in FIG. 2(a), the extension area may be edge areas disposed on two sides of a curved screen or a planar screen. The user may perform an operation in the extension area on the two sides, and the operation is responded to in the display area.

As shown in FIG. 2(b), the extension area may be a partial edge area disposed on one side of a curved screen or a planar screen. The user may perform an operation in the extension area on the side, and the operation is responded to in the display area.

As shown in FIG. 2(c), the extension area may be one screen of a foldable screen, for example, a secondary screen, and the display area is a primary screen. The user may perform an operation on the secondary screen, and the operation is responded to on the primary screen.

As shown in FIG. 2(d), the extension area may be a foldable area in a foldable screen. The user may perform an operation in the foldable area, and the operation is responded to on a primary screen or a secondary screen that is used as the display area.

In this embodiment of this application, the extension area may receive a touch operation of the user by using a touch component, and the display area may be used as a conventional independent display, and is further configured to respond to the touch operation of the user from the extension area. Regardless of whether a touch operation is present, the extension area may be in a blank screen state, or may be used to display only time, weather, memo information, and the like.

A software system of the mobile phone 100 may use a layered architecture, and the software system of the mobile phone 100 may use the layered architecture, an event-driven architecture, a microcore architecture, a microservice architecture, or a cloud architecture. In this embodiment of this application, an Android system with a layered architecture is used as an example to describe a software structure of the mobile phone 100.

Figure 3:
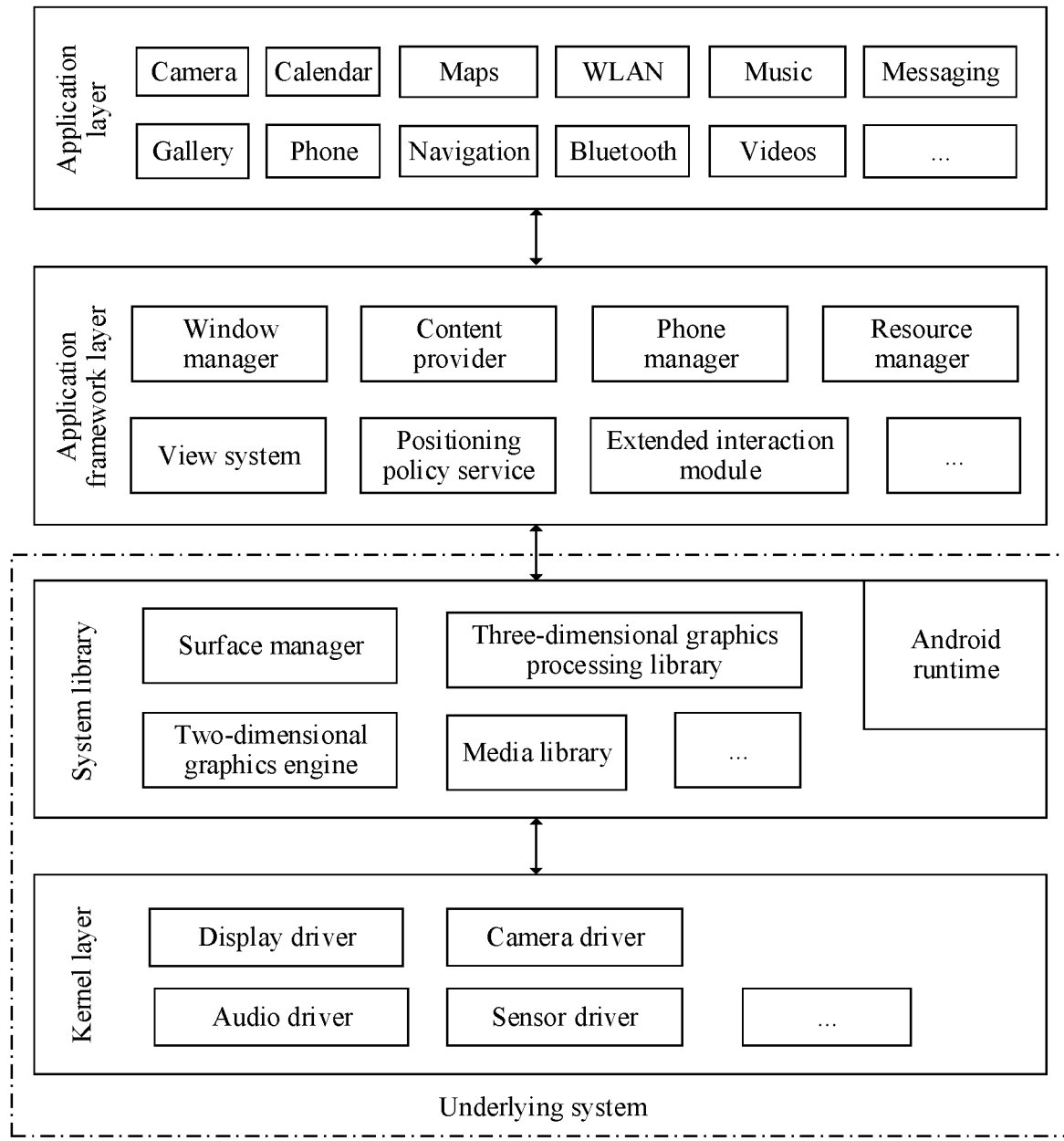
FIG. 3 is a schematic diagram of a software structure of an interactive system according to an embodiment of this application.

FIG. 3 is a block diagram of a software structure of the mobile phone 100 according to an embodiment of this application.

In the layered architecture, software is divided into several layers, and each layer has a role and a task. The layers communicate with each other by using a software interface. In some embodiments, the Android system is divided into four layers: an application layer, an application framework layer, an Android Runtime and system library, and a kernel layer from top to bottom.

The application layer may include a series of application packages.

As shown in FIG. 3, the application packages may include applications such as camera, gallery, calendar, phone, maps, navigation, WLAN, Bluetooth, music, videos, and messaging.

The application framework layer provides an application programming interface (API) and a programming framework for an application at the application layer. The application framework layer includes some predefined functions.

As shown in FIG. 3, the application framework layer may include a window manager, a positioning policy service, an extended interaction module, a content provider, a view system, a phone manager, a resource manager, a notification manager, and the like. In another embodiment of this application, the positioning policy service and the extended interaction module may alternatively be disposed in an underlying system. This is not uniquely limited herein.

As shown in FIG. 3, the kernel layer is a layer between hardware and software. The kernel layer includes at least a display driver, a camera driver, an audio driver, and a sensor driver.

As shown in FIG. 3, the system library may include a plurality of function modules, for example, a surface manager, a media library (Media Libraries), a three-dimensional graphics processing library (for example, OpenGL ES), and a 2D graphics engine (for example, SGL).

As shown in FIG. 3, the system library and the kernel layer that are below the application framework layer may be referred to as an underlying system. The underlying system includes an underlying display system that is configured to provide a display service. For example, the underlying display system may include the display driver at the kernel layer, the surface manager in the system library, and the like.

The Android Runtime includes a core library and a virtual machine. The Android Runtime is responsible for scheduling and management of the Android system.

The kernel library includes two parts: a function that needs to be invoked in java language and a core library of Android.

The application layer and the application framework layer run on the virtual machine. The virtual machine executes java files at the application layer and the application framework layer as binary files. The virtual machine is configured to implement functions such as object lifecycle management, stack management, thread management, security and exception management, and garbage collection.

The media library supports playback and recording in a plurality of commonly used audio and video formats, static image files, and the like. The media library may support a plurality of audio and video encoding formats, for example, MPEG4, H.264, MP3, AAC, AMR, JPG, and PNG. The 2D graphics engine is a drawing engine for 2D drawing.

The three-dimensional graphics processing library is configured to implement three-dimensional graphics drawing, image rendering, composition, layer processing, and the like.

According to an embodiment of this application, the underlying display system may obtain a screen size of the display area, a screen size of the extension area, and an original screen size of the display, and notify the entire system that an area used for display of the mobile phone 100 is the screen size of the display area.

For example, the display is an LCD display. As shown in FIG. 4(a) and FIG. 4(b), an original screen size of the display is A, a screen size of a display area that is actually used for display is A1, and a display configuration of a display driver changes the screen size A of the display to A1. In other words, although the original screen size of the display is A, the underlying display system notifies the entire system that a screen size for display is A1 (the screen size of the display area), where the notification may be configured by using a display configuration information command (config) of the Android system, and the interface for obtaining the screen size for display is modified.

The window manager is configured to manage a window program. The window manager may obtain the screen size A1 of the display area used for display from the underlying display system. In other words, the window manager invokes an interface of the screen size that has been modified by the underlying display system, to obtain the screen size A1 of the display area used for display, so that an operation of the user at any location on the display may be responded to and displayed in the display area on the display of the mobile phone 100. The extension area may receive and distribute, by using an extended interaction module, an operation performed by the user in the extension area.

According to another embodiment of this application, FIG. 4(*a*) and FIG. 4(*b*) show an example of screen sizes of the display, the extension area, and the display area. As shown in FIG. 4(*a*) and FIG. 4(*b*), the underlying display system may obtain the original screen size A of the display, and the window manager obtains the original screen size A of the display from the underlying system. The window manager may include a split screen management service. The split screen management service may divide the display screen size A that is obtained from the underlying display system into the extension area and the display area used for display, and obtain the screen size A1 of the display area and a size A2 of the extension area. In addition, the size of the display area is used as a screen size that is of the mobile phone 100 and that is used for display, an application in the application package is placed in the display area, and the extension area is used as a to-be-operated area for the user. The extension area may receive and distribute, by using the extended interaction module, an operation performed by the user in the extension area.

The extended interaction module receives event information corresponding to the operation performed in the extension area. For example, the event information may be one or more of a tap event, a touch and hold event, a slide event, and a user-predetermined touch event, or may be understood as coordinates and a timestamp that are of an original touch point when the user performs a touch operation in the extension area.

The positioning policy service may be configured to receive the event information transmitted by the extended interaction module, obtain the screen sizes and locations that are of the display area and the extension area from the underlying display system or the window manager, and obtain, according to a mapping rule, an operation in the display area corresponding to the event information.

According to an embodiment of this application, the mapping rule may be a preset operation that is pre-designed and stored in a system. For example, a mapping relationship is established between an operation a in the extension area and an operation b in the display area. When receiving the operation a from the extension area, the positioning policy service provides the corresponding operation b for the display system, so that the display system drives, based on the b operation provided by the positioning policy service, the display area to display the operation b. The preset operation may be a preset operation that is pre-stored in the system, or may be an operation that is set based on a requirement of the user.

According to another embodiment of this application, the mapping rule may alternatively be: obtaining the operation in the display area corresponding to the event information through calculation based on coordinates of an original touch point of the event information in a preset coordinate system and a relationship between screen sizes of the display area and the extension area. For example, a proportional relationship between A1 and A2 is calculated based on the screen size A1 of the display area for display and the screen size A2 of the extension area. Then, the operation in the display area corresponding to the event information is obtained through calculation with reference to the coordinates of the original touch point of the event information, and the operation corresponding to the event information is responded to in the display area. The proportional relationship between A1 and A2 includes an equal proportional relationship, that is, A1 to A2 equals 1 to 1, or a non-equal proportional relationship, that is, A1 is greater than A2, or A1 is less than A2.

The following uses an example in which a mobile phone is used as an interactive system, and describes in detail a display method for an interactive system provided in this application with reference to the accompanying drawings.

In an embodiment of this application, FIG. 5 is a flowchart of a display method for an interactive system. As shown in FIG. 5, the method includes the following operations:

Operation S501: Determine a display area and an extension area that are obtained by dividing a display, where the display area and the extension area may be two different areas that belong to a same physical display. For example, when the display is a curved screen, a planar screen, or a foldable screen of a flexible screen, the extension area may be an edge area or a partial area that is of the curved screen or the planar screen, or a primary screen or a secondary screen that is of the foldable screen, or a folded area formed after the foldable screen is folded. An area on the display other than the extension area is the display area. The display area and the extension area may alternatively belong to two physical screens.

When the display area and the extension area belong to one screen, for a division manner of the display area and the extension area, refer to division performed by the underlying display system or division performed by the window manager of the window layer in the foregoing embodiment. Details are not described herein again.

When the display area and the extension area belong to two different physical screens, sizes of the two screens are determined and have been recorded by the system.

Figure 6:
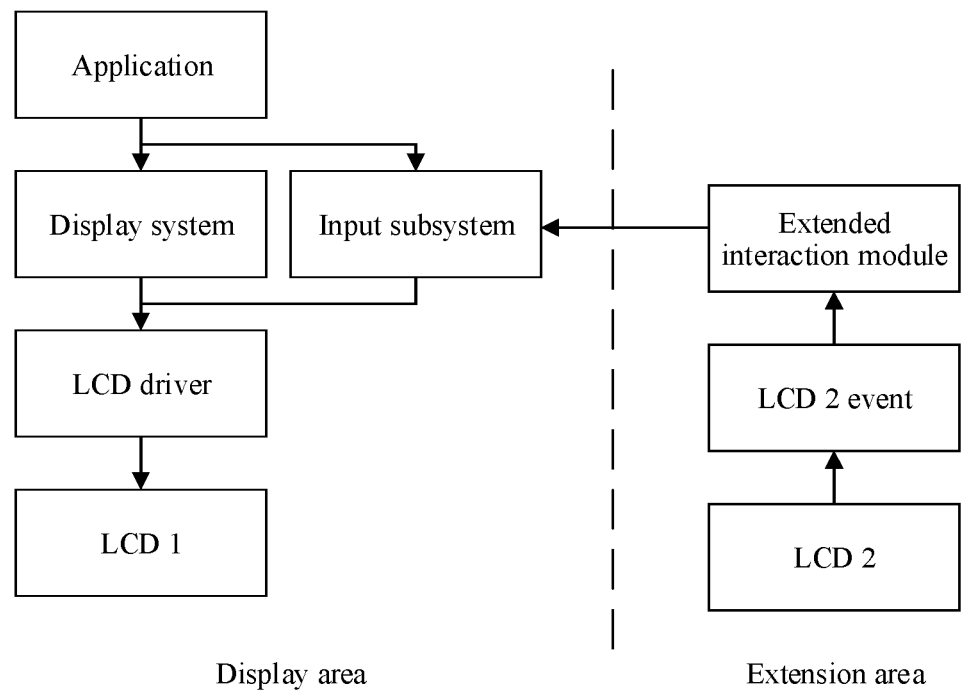
FIG. 6 is a schematic diagram of an architecture of an internal operating system of an interactive system according to an embodiment of this application.

FIG. 6 is a schematic diagram of an architecture of an internal operating system of an interactive system according to an embodiment of this application. As shown in FIG. 3 and FIG. 6, a display area and an extension area may be connected by using an extended interaction module, to transmit event information of the extension area to the display area. For example, when a touch operation is performed on an LCD 2 in the extension area, a touch control generates corresponding LCD 2 event information, and an extended interaction module sends the LCD 2 event information to an input subsystem. The input subsystem obtains, by using a mapping rule of the positioning policy service, an operation in the display area corresponding to the event information. Further, the display system and an LCD driver power on an LCD 1, and the operation corresponding to the event information is responded to in the display area. The positioning policy service in this application may be disposed in the input subsystem, or may exist independent of the input subsystem, and this is not limited herein.

Operation S502: Generate event information based on an operation performed by a user on the extension area, where the event information includes information corresponding to one or more of a tap event, a touch and hold event, a slide event, and a user-predetermined touch event.

Operation S503: Respond, in the display area based on the event information, to an operation corresponding to the event information. Responding to the operation corresponding to the event information may include waking up the display area, or may be mapping the event information to the display area based on a size relationship between the display area and the extension area, and responding, in the display area, to the operation corresponding to the event information.

The following uses a mobile phone as an example to describe in detail a process of mapping the event information in the extension area to the display area with reference to a plurality of mapping scenarios.

Figure 7:
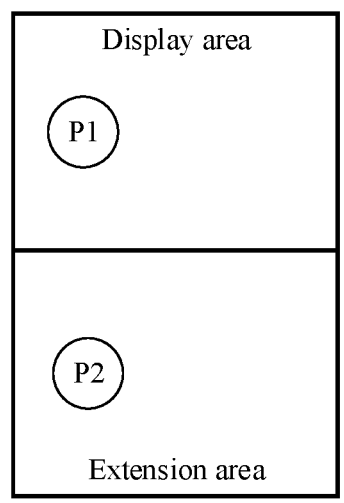
FIG. 7 is a schematic diagram of a structure of a mapping scenario 1 of a display method for an interactive system according to an embodiment of this application.
Figures 8A, 8B:
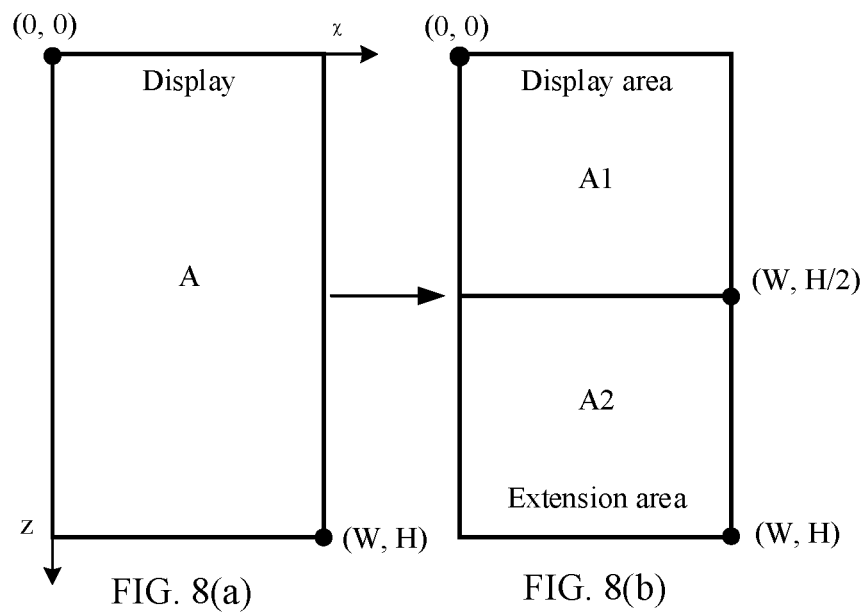
FIG. 8(a) and FIG. 8(b) are a schematic diagram of a structure of locations of a display, an extension area, and a display area that are in a preset coordinate system according to an embodiment of this application.

FIG. 7 is a schematic diagram of a mapping scenario 1. As shown in FIG. 7, a display of the mobile phone is exemplarily divided into a screen size A1 of the display area and a screen size A2 of the extension area. In a example, A1 and A2 are in an equal proportional relationship. However, this application is not limited thereto. P2 is a single-tap operation performed by the user in the extension area, where the operation may be received by a touch component and corresponding event information may be generated, to determine that the operation is a tap event and obtain a location of an original touch point P2 of the tap event in a preset coordinate system. FIG. 8(a) shows a location of the display A in the preset coordinate system, and FIG. 8(b) shows locations of the display area A1 and the extension area A2 in the preset coordinate system, to determine coordinates of P2 in the preset coordinate system. If the coordinates of P2 are (W, 0.7 H), coordinates of P1 that are obtained after P2 is mapped in the display area and that are obtained through calculation by using the positioning policy service are (W, 0.2 H), so that the user affects an operation in the display area by performing an operation in the extension area.

Figure 9:
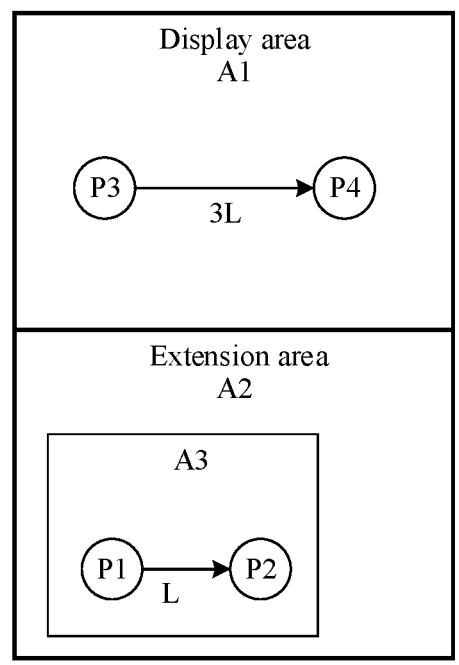
FIG. 9 is a schematic diagram of a structure of a mapping scenario 2 of a display method for an interactive system according to an embodiment of this application.

FIG. 9 is a schematic diagram of a mapping scenario 2. In an extension area, alternatively, only some areas are used for a user operation, and the other parts are used to set a virtual button or the like. As shown in FIG. 9, screen sizes of a display area A1 and an extension area A2 that are obtained by dividing a display of a mobile phone are in an equal proportional relationship. In the extension area A2, only an area A3 is used for an input operation of the user. For a mapping process, refer to the calculation method described in the mapping scenario 1. In addition, an operation in A3 may be scaled proportionally with reference to a screen size proportional relationship between A3 and A1. For example, A1 to A3 is 3 to 1. When the user taps P1 and P2 at two different locations on A3, a distance L between the two points may be obtained. After coordinate calculation, coordinates of the two points at corresponding locations are obtained in the display area. After L is scaled up proportionally by three times, locations of two points P3 and P4 that are mapped in the display area and that are finally determined are obtained. It should be noted that the area A3 may alternatively be directly used as an extension area. For a mapping process thereof, refer to the scenario 2, and details are not described herein again.

Figure 10:
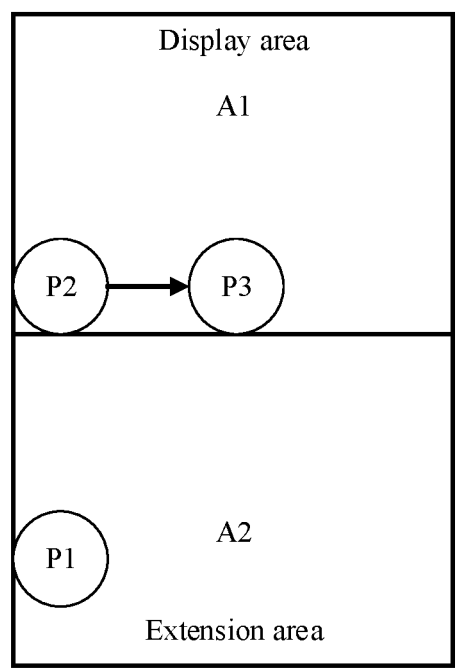
FIG. 10 is a schematic diagram of a structure of a mapping scenario 3 of a display method for an interactive system according to an embodiment of this application.

FIG. 10 is a schematic diagram of a mapping scenario 3. As shown in FIG. 10, a display of a mobile phone is exemplarily divided into a display area whose screen size is A1 and an extension area whose screen size is A2. P1 is a single-tap operation performed by a user in the extension area, and may be mapped to sliding in the display area, for example, sliding from P2 to P3. A distance between P2 and P3 may be calculated by obtaining time of the tap operation. For example, a longer tap time of the user at the location P1 indicates a longer sliding distance between P2 and P3. Alternatively, a tap operation in the extension area may be mapped to an operation of simultaneously tapping a plurality of points in the display area. The mapping relationship may be a mapping rule that is pre-stored in the mobile phone and that is implemented by the positioning policy service. For example, the system stores a mapping rule that an event A from the extension area is equal to an event B in the display area. Once the positioning policy service receives the event A from the extension area, the event A is associated with the event B in the display area according to the rule. In addition, in combination with the display system, a process in which the extension area affects the display area through interaction is implemented. For example, the user performs a single-tap operation P1 in the extension area, and the positioning policy service responds, in the display area according to a preset mapping rule, to a corresponding operation of sliding from a location P2 to a location P3. The user may set a preset operation based on a requirement. For example, the user may set, by using a setting function of the extension area, that a single-tap operation is equal to a double-tap operation in the display area. In addition, the mapping rule may be in an overall effective mode or a partial effective mode. The effective mode may alternatively be set based on a user requirement. That the mapping rule is overall effective means that the mapping rule is valid in any application and scenario. For example, in any scenario, as long as a single-tap operation is performed in the extension area, the single-tap operation is mapped to an operation of sliding from the location P2 to the location P3 in the display area. The mapping rule may alternatively take effect in some scenarios. For example, only when the display area is in a sleep state can a touch operation performed by the user in the extension area be used as a wake-up operation in the display area, to light up the display area. For another example, in a scenario of the Arena of Valor game, a single-tap operation in the extension area is equivalent to a multi-button press in a game scenario to implement skill release, so that interaction experience of the user is improved.

According to an embodiment of this application, the user may alternatively set a preset operation by using a recording interface to implement interaction definition. For example, the user selects a common operation such as tapping, touching and holding, sliding, or sliding by moving away with two fingers in the extension area, or directly performs an operation in the extension area for a period of time, for example, sliding for a distance L in the screen. In this way, the preset operation in the display area may be tapping, touching and holding, sliding, moving away with two fingers, or the like.

After the preset operation in the extension area is defined and recorded, recording is performed in the display area. A button pressing behavior in the display area may be recorded by the system, including all original button pressing information such as coordinates, a location, and duration. The user may define a mapping rule for an operation in the extension area and an operation recorded in the display area. When the user inputs a preset operation in the extension area, the extended interaction module receives and distributes the preset operation to the positioning policy service, and the positioning policy service maps the defined preset operation to a preset operation recorded in the display area, and responds, in the display area, to the corresponding operation recorded in the display area.

Figure 11:
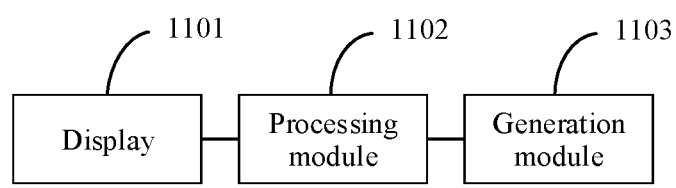
FIG. 11 is a schematic diagram of a structure of an interactive system according to an embodiment of this application.

Based on the descriptions of the foregoing embodiments, the interactive system in this application is described. As shown in FIG. 11, the interactive system includes a display 1101, a processing module 1102, and a generation module 1103.

In one embodiment, the processing module 1102 is configured to determine a display area and an extension area that are obtained by dividing the display. The generation module is configured to generate event information based on an operation performed by a user on the extension area. The processing module is configured to respond, in the display area based on the event information, to an operation corresponding to the event information. The event information includes information corresponding to one or more of a tap event, a touch and hold event, a slide event, a user-predetermined touch event, and screen recording. The operation corresponding to the event information includes one or more of a tap event, a touch and hold event, a slide event, and a user-predetermined touch event.

According to an embodiment of this application, the display area and the extension area are two different areas that belong to a same physical display. For example, when the display is a curved screen, a planar screen, or a foldable screen, the extension area is disposed on an edge area or a partial area that is of the curved screen or the planar screen; or the extension area is disposed on one screen of the foldable screen, or a folded area formed after the foldable screen is folded.

According to an embodiment of this application, the display area and the extension area respectively belong to two different physical displays. For example, for a foldable screen that has two screens, one screen of the foldable screen is used as a display area, and the other screen thereof is used as an extension area.

According to an embodiment of this application, division of the display area and the extension area is determined by an underlying display system, and the display area and the extension area are obtained by dividing the display. The processing module 1102 is further configured to: determine an original screen size of the display, a size of the display area, and a screen size of the extension area; indicate the size of the display area as a screen size for system display; and use the display area for displaying of the interactive system.

According to another embodiment of this application, division of the display area and the extension area is determined by a window layer, and the display area and the extension area are obtained by dividing the display. The processing module 1102 is further configured to: determine an original screen size of the display, a size of the display area, and a screen size of the extension area; indicate the screen size of the display area as a screen size for system display; and use the display area for displaying of the interactive system.

According to an embodiment of this application, the processing module 1102 is configured to: determine a screen size of the display area and a screen size of the extension area; map event information to the display area based on a relationship between the screen size of the display area and the screen size of the extension area; and respond, in the display area, to an operation corresponding to the event information.

According to an embodiment of this application, the processing module 1102 is further configured to: determine locations of the display area and the extension area in a preset coordinate system; determine, based on the preset coordinate system, coordinates of an original touch point of the event information in the preset coordinate system, and determine a location of the original touch point relative to the display area and the extension area; and map, based on the coordinates and the relationship between the screen size of the display area and the screen size of the extension area, the coordinates of the original touch point of the event information to a corresponding location in the display area.

According to an embodiment of this application, the processing module 1102 is further configured to establish a mapping relationship between a preset operation in the extension area and an operation in the display area, so that the preset operation input by the user in the extension area is mapped to the operation performed by the user in the display area.

Figure 12:
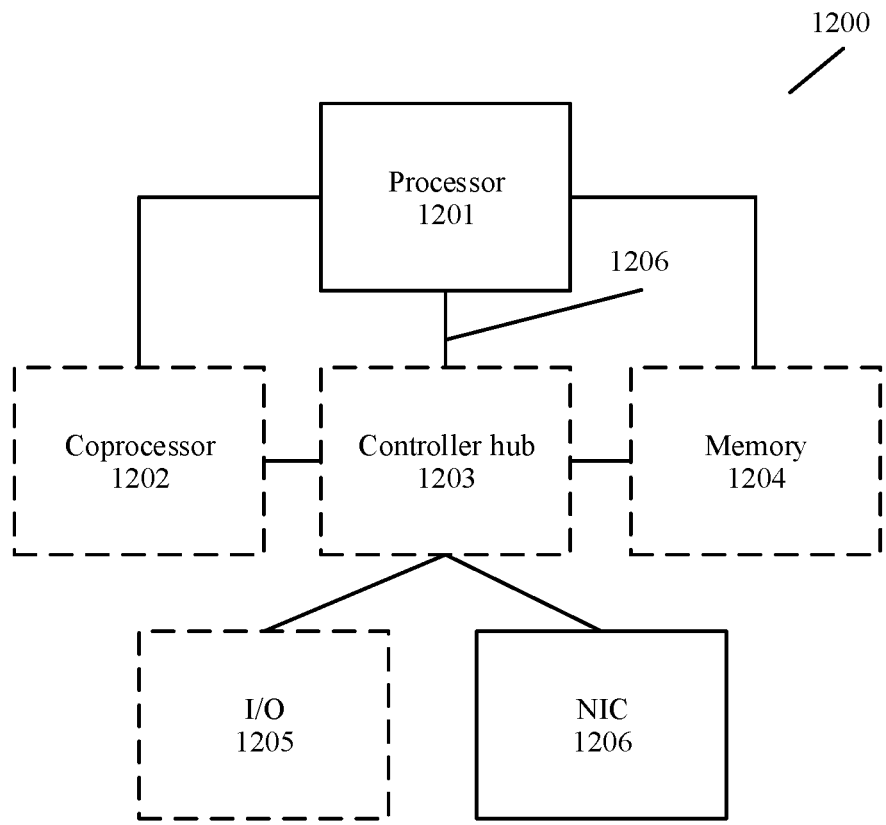
FIG. 12 is a block diagram of a device according to some embodiments of this application.

Reference is now made to FIG. 12. FIG. 12 shows a block diagram of a device 1200 according to an embodiment of this application. The device 1200 may include one or more processors 1201 coupled to a controller hub 1203. For at least one embodiment, the controller hub 1203 communicates with the processor 1201 by using a multi-branch bus such as a front side bus (FSB), a point-to-point interface such as a quick path interconnect (QPI) interface, or a similar connection 1206. The processor 1201 executes instructions for controlling a general type of data processing operation. In an embodiment, the controller hub 1203 includes, but is not limited to, a graphics memory controller hub (GMCH) (not shown) and an input/output hub (IOH) (which may be on separate chips) (not shown). The GMCH includes a memory and a graphics controller, and is coupled to the IOH.

The device 1200 may further include a coprocessor 1202 and a memory 1204 that are coupled to the controller hub 1203. Alternatively, one or both of the memory and the GMCH may be integrated into the processor (as described in this application). The memory 1204 and the coprocessor 1202 are directly coupled to the processor 1201 and the controller hub 1203. The controller hub 1203 and the IOH are located in a single chip. The memory 1204 may be, for example, a dynamic random access memory (DRAM), a phase change memory (PCM), or a combination of both. In an embodiment, the coprocessor 1202 is an application-specific processor, for example, a high-throughput MIC (Many Integrated Core, MIC) processor, a network or communication processor, a compression engine, a graphics processing unit, a general-purpose graphics processing unit (GPGPU), or an embedded processor. An optional property of the coprocessor 1202 is shown in FIG. 12 in dashed lines.

As a computer-readable storage medium, the memory 1204 may include one or more tangible non-transitory computer-readable media that are configured to store data and/or instructions. For example, the memory 1204 may include any suitable non-volatile memory such as a flash memory and/or any suitable non-volatile storage device, for example, one or more hard-disk drives (HDD(s)), one or more compact disc (CD) drives, and/or one or more digital versatile disc (DVD) drives.

In an embodiment, the device 1200 may further include a network interface (NIC) 1206. The network interface 1206 may include a transceiver, configured to provide a radio interface for the device 1200, to communicate with any other suitable device (such as a front-end module or an antenna). In various embodiments, the network interface 1206 may be integrated with another component of the device 1200. The network interface 1206 may implement a function of the communication unit in the foregoing embodiments.

The device 1200 may further include an input/output (I/O) device 1205. The I/O 1205 may include: a user interface designed to enable a user to interact with the device 1200; a peripheral component interface designed to enable a peripheral component to interact with the device 1200; and/or a sensor designed to determine an environmental condition and/or location information related to the device 1200.

It should be noted that FIG. 12 is merely an example. In other words, although FIG. 12 shows that the device 1200 includes a plurality of components such as the processor 1201, the controller hub 1203, and the memory 1204, in actual application, a device that uses the methods in this application may only include some of the components of the device 1200, for example, may only include the processor 1201 and the NIC 1206. In FIG. 12, properties of the optional components are shown by using dashed lines.

According to some embodiments of this application, the memory 1204 that is used as a computer readable storage medium stores instructions. When the instructions are executed on a computer, the system 1200 performs the method for the interactive system in the foregoing embodiment. For details, refer to the method in the foregoing embodiment. Details are not described herein again.

Figure 13:
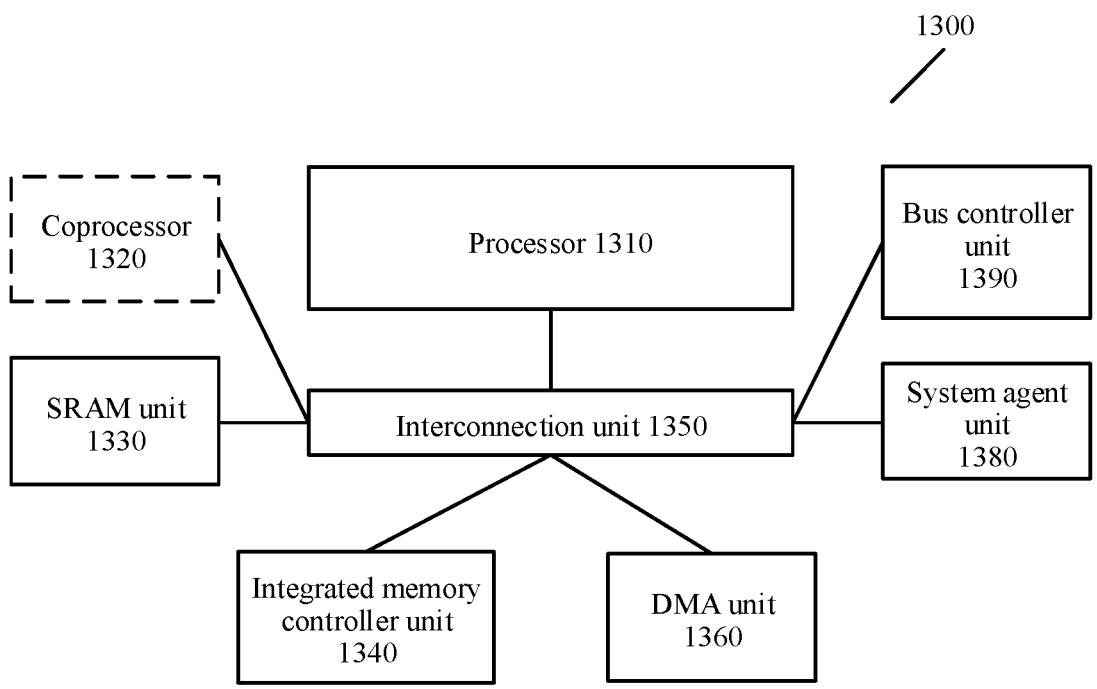
FIG. 13 is a block diagram of a System-on-a-Chip (SoC) according to some embodiments of this application.

Now refer to FIG. 13. FIG. 13 shows a block diagram of a SoC (System on Chip, System-on-a-Chip) 1300 according to an embodiment of this application. In FIG. 13, similar parts have a same reference numeral. In addition, a dashed-line box is an optional feature of a more advanced SoC. In FIG. 13, the SoC 1300 includes: an interconnection unit 1350 that is coupled to an application processor 1310; a system agent unit 1380; a bus controller unit 1390; an integrated memory controller unit 1340; one group of coprocessors 1320 or one or more coprocessors 1320 that may include integrated graphics logic, an image processing unit, an audio processor, and a video processor; a static random access memory (SRAM) unit 1330; and a direct memory access (DMA) unit 1360. In an embodiment, the coprocessor 1320 includes an application-specific processor, for example, a network or communication processor, a compression engine, a GPGPU, a high-throughput MIC processor, or an embedded processor.

The static random access memory (SRAM) unit 1330 may include one or more computer-readable media for storing data and/or instructions. The computer-readable storage medium may store instructions, and, in one embodiment, store temporary and permanent copies of the instructions. The instruction may include the following: When being executed by at least one unit in the processor, the instruction enables the SoC 1300 to execute the display method for the interactive system according to the foregoing embodiment. For details, refer to the display method in the foregoing embodiment, and details are not described herein again.

Embodiments of mechanisms disclosed in this application may be implemented in hardware, software, firmware, or a combination of these implementation methods. Embodiments of this application may be implemented as a computer program or program code that is executed on a programmable system, and the programmable system includes at least one processor, a storage system (including volatile and non-volatile memory and/or storage elements), at least one input device, and at least one output device.

The program code may be configured to input instructions, to perform functions described in this application and generate output information. The output information may be applied to one or more output devices in a known manner. For a purpose of this application, a processing system includes any system that has a processor such as a digital signal processor (DSP), a microcontroller, an application-specific integrated circuit (ASIC), or a microprocessor.

The program code may be implemented in a high-level procedural language or an object-oriented programming language, to communicate with the processing system. The program code may alternatively be implemented by using an assembly language or a machine language when needed. Actually, the mechanism described in this application is not limited to a scope of any particular programming language. In any case, the language may be a compiled language or an interpretive language.

In some cases, the disclosed embodiments may be implemented by hardware, firmware, software, or any combination thereof. The disclosed embodiments may be alternatively implemented as instructions carried by or stored on one or more temporary or non-temporary machine-readable (for example, computer-readable) storage media, and the instructions may be read and executed by one or more processors. For example, the instructions may be distributed through a network or another computer-readable medium. Therefore, the machine-readable medium may include any mechanism for storing or transmitting information in a machine (for example, a computer)-readable form. The machine-readable medium includes but is not limited to a floppy disk, an compact disc, an optical disc, a compact disc read-only memory (CD-ROMs), a magneto-optical disc, a read-only memory (ROM), random access memory (RAM), erasable programmable read-only memory (EPROM), electrically erasable programmable read-only memory (EEPROM), magnetic or optical card, flash memory, or a tangible machine-readable memory that is configured to transmit information through Internet by using electricity, light, sound or another form of propagating signal (for example, carrier wave, infrared signal, or digital signal). Therefore, the machine-readable medium includes any type of machine-readable medium that is suitable for storing or transmitting electronic instructions or information in a machine (for example, a computer)-readable form.

In the accompanying drawings, some structural or method features may be shown in a particular arrangement and/or order. However, it should be understood that such a particular arrangement and/or order may not be required. In some embodiments, these features may be arranged in a manner and/or order different from that shown in the accompanying drawings of the specification. In addition, inclusion of the structural or method features in a particular figure does not imply that such features are required in all embodiments, and in some embodiments, these features may not be included or may be combined with other features.

It should be noted that all units/modules mentioned in the device embodiments of this application are logical units/modules. Physically, one logical unit/module may be one physical unit/module, or may be a part of one physical unit/module, or may be implemented by a combination of a plurality of physical units/modules. Physical implementations of these logical units/modules are not most important, and a combination of functions implemented by these logical units/modules is a key to resolving the technical problem proposed in this application. In addition, to highlight an innovative part of this application, a unit/module that is not closely related to resolving the technical problem proposed in this application is not introduced in the foregoing device embodiments of this application. This does not indicate that there is not another unit/module in the foregoing device embodiments.

It should be noted that, in the examples and specification of this patent, relational terms such as first and second are only used to distinguish one entity or operation from another entity or operation, and do not necessarily require or imply that any actual relationship or sequence exists between these entities or operations. Moreover, the terms "include", "contain", or any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a" does not, without more constraints, preclude the presence of additional identical elements in the process, method, article, or device that includes the element.

Although this application has been illustrated and described with reference to some preferred embodiments of this application, a person of ordinary skill in the art should understand that various changes may be made to this application in form and detail without departing from the spirit and scope of this application.

What is claimed is:

1. A display method for an interactive system including a display on a device, the method comprising:
    determining a display area and an extension area that are obtained by dividing the display;
    generating event information based on a first operation performed by a user on the extension area;
    mapping the first operation in the extension area to a second operation in the display area according to a mapping relationship, wherein the extension area is in a blank screen state at least during the mapping the first operation in the extension area to the second operation in the display area, and wherein the first operation is a tap operation and the second operation is a sliding operation based directly on the tap operation, the mapping further comprising:
        determining a screen size of the display area and a screen size of the extension area;
        determining, based on a preset coordinate system, coordinates of an original touch point of the event information in the preset coordinate system, and determining a location of the original touch point relative to the display area and the extension area; and
        mapping, based on the coordinates and a relationship between the screen size of the display area and the screen size of the extension area, the coordinates of the original touch point of the event information to a corresponding location in the display area; and
    processing, by the device, the sliding operation that was mapped from the tap operation, wherein a sliding distance of the sliding operation is proportional to a tap time of the tap operation.

2. The method according to claim 1, wherein the display area and the extension area are two different areas that belong to a same physical display.

3. The method according to claim 2, wherein, the division for the display area and the extension area is determined by an underlying display system, and, that the display area and the extension area are obtained by dividing the display comprises:
    determining an original screen size of the display; and
    indicating the screen size of the display area as a screen size for a system display, and using the display area for displaying of the interactive system.

4. The method according to claim 2, wherein, the division for the display area and the extension area is determined by a window layer, and, that the display area and the extension area are obtained by dividing the display comprises:
    determining an original screen size of the display; and
    indicating the screen size of the display area as a screen size for a system display, and using the display area for displaying of the interactive system.

5. The method according to claim 1, wherein, the display area and the extension area, respectively, belong to two different physical displays.

6. The method according to claim 1, wherein, the event information comprises:
    information corresponding to a tap event.

7. The method according to claim 1, wherein, the display is a curved screen, and the extension area is disposed on an edge area or a partial area that is of the curved screen.

8. The method according to claim 1, wherein, the display is a planar screen, and the extension area is disposed on an edge area or a partial area that is of the planar screen.

9. The method according to claim 1, wherein, the display is a foldable screen, and the extension area is disposed on one screen of the foldable screen.

10. The method according to claim 1, wherein, the display is a foldable screen, and the extension area is disposed on a folded area formed after the foldable screen is folded.

11. An electronic device comprising:
    a processor; and
    a non-transitory computer readable medium which contains computer-executable instructions;
    wherein, the processor is configured to execute the computer-executable instructions to enable the electronic device to perform operations comprising:
        determining a display area and an extension area that are obtained by dividing a display;
        generating event information based on a first operation performed by a user on the extension area;
        mapping the first operation in the extension area to a second operation in the display area according to a mapping relationship, wherein the extension area is in a blank screen state at least during the mapping the first operation in the extension area to the second operation in the display area, and wherein the first operation is a tap operation and the second operation is a sliding operation based directly on the tap operation, the mapping further comprising:
            determining a screen size of the display area and a screen size of the extension area;
            determining, based on a preset coordinate system, coordinates of an original touch point of the event information in the preset coordinate system, and determining a location of the original touch point relative to the display area and the extension area; and
            mapping, based on the coordinates and a relationship between the screen size of the display area and the screen size of the extension area, the coordinates of the original touch point of the event information to a corresponding location in the display area; and
        processing the sliding operation that was mapped from the tap operation, wherein a sliding distance of the sliding operation is proportional to a tap time of the tap operation.

12. The electronic device according to claim 11, wherein the display area and the extension area are two different areas that belong to a same physical display.

13. The electronic device according to claim 12, wherein, the division for the display area and the extension area is determined by an underlying display system, and, that the display area and the extension area are obtained by dividing the display comprises:
    determining an original screen size of the display; and
    indicating the screen size of the display area as a screen size for a system display, and using the display area for displaying of an interactive system.

14. The electronic device according to claim 12, wherein, the division for the display area and the extension area is determined by a window layer, and, that the display area and the extension area are obtained by dividing the display comprises:

determining an original screen size of the display; and
indicating the screen size of the display area as a screen size for a system display, and using the display area for displaying of an interactive system.

15. The electronic device according to claim 11, wherein, the display area and the extension area respectively belong to two different physical displays.

16. A non-transitory computer readable medium which contains computer-executable instructions, wherein the computer-executable instructions, when executed by a processor, enables an electronic device to perform operations comprising:
   determining a display area and an extension area that are obtained by dividing a display;
   generating event information based on a first operation performed by a user on the extension area;
   mapping the first operation in the extension area to a second operation in the display area according to a mapping relationship, wherein the extension area is in a blank screen state at least during the mapping the first operation in the extension area to the second operation in the display area, and wherein the first operation is a tap operation and the second operation is a sliding operation based directly on the tap operation, the mapping further comprising:
      determining a screen size of the display area and a screen size of the extension area;
      determining, based on a preset coordinate system, coordinates of an original touch point of the event information in the preset coordinate system, and determining a location of the original touch point relative to the display area and the extension area; and
      mapping, based on the coordinates and a relationship between the screen size of the display area and the screen size of the extension area, the coordinates of the original touch point of the event information to a corresponding location in the display area; and
   processing, by the device, the sliding operation that was mapped from the tap operation, wherein a sliding distance of the sliding operation is proportional to a tap time of the tap operation.

17. The non-transitory computer readable medium according to claim 16, wherein the display area and the extension area are two different areas that belong to a same physical display.

18. The non-transitory computer readable medium according to claim 17, wherein, the division for the display area and the extension area is determined by an underlying display system, and, to obtain the display area and the extension area by dividing the display, the electronic device performs operations comprising:
   determining an original screen size of the display; and
   indicating the screen size of the display area as a screen size for a system display, and using the display area for displaying of an interactive system.

19. The non-transitory computer readable medium according to claim 17, wherein, the division for the display area and the extension area is determined by a window layer, and, to obtain the display area and the extension area by dividing the display, the electronic device performs operations comprising:
   determining an original screen size of the display; and
   indicating the screen size of the display area as a screen size for a system display, and using the display area for displaying of an interactive system.

* * * * *